United States Patent [19]

Graham

[11] 3,932,193
[45] Jan. 13, 1976

[54] FORMING SIZE FOR TEXTILE GLASS FIBERS
[75] Inventor: Roy R. Graham, Lexington, N.C.
[73] Assignee: PPG Industries, Inc., Pittsburgh, Pa.
[22] Filed: Apr. 29, 1974
[21] Appl. No.: 464,861

[52] U.S. Cl. .................... 106/211; 106/213; 65/3
[51] Int. Cl.² ..................... C08L 3/00; C09J 3/06
[58] Field of Search .......................... 106/211–213; 65/3

[56] References Cited
UNITED STATES PATENTS
3,615,311  10/1971  Ignatius ............................ 106/210

Primary Examiner—Theodore Morris
Attorney, Agent, or Firm—John E. Curley; Robert DeMajistre

[57] ABSTRACT

A sizing composition for textile glass fibers comprising a starch, a textile softener, a lubricant and 100 to 150 percent by weight of combined nonionic wetting agents based upon the weight of said lubricant. The glass fibers sized in accordance with this sizing composition has found utility in forming untwisted yarns which are to be subsequently used for the weft of a textile glass fabric.

4 Claims, No Drawings

FORMING SIZE FOR TEXTILE GLASS FIBERS

BACKGROUND OF THE INVENTION

This invention relates to a process for preparing glass fibers and particularly to the application of a size to continuous filament glass fiber strand during the formation of the strand.

In the production of continuous filament glass fiber strands, a number of individual glass filaments are drawn from an electrically heated platinum alloy bushing containing a molten supply of the glass. The glass passes through tipped orifices in the bottom of the bushing and forms inverted cones of glass at the ends of the tips. Individual filaments are drawn from the cones of glass at a high rate of speed, i.e., 5,000 to 20,000 feet per minute and are grouped into a strand as they pass over a suitable guide. The strand is thereafter wound on a rapidly rotating forming package.

There is no twist in the strand as it is formed and an aqueous size composed of a dispersion of a binder, a lubricant such as detrinized corn starch and a vegetable oil is applied to the individual filaments prior to the time they are grouped into the strand and wound on the forming tube. In order to bond the filaments together and maintain the integrity of the strand, the forming size is deposited on the filaments to provide a level of forming size solids of about 0.7 to about 2 percent by weight based on the weight of the glass. The strand is wound on the tube with a slight traverse so that succeeding turns cross each other at an angle, rather than being parallel to each other so that the strand can be more easily removed from the tube.

A typical glass fiber sizing composition is disclosed in U.S. Pat. No. 3,227,192 which is a sizing composition used for sizing glass fibers which are to be subsequently woven into cloth. Usually, after the forming package is wound, it is placed in an oven to dry or allowed to air dry to reduce the moisture content thereof so that the strand on the forming package can be removed therefrom. After the forming package is dried, the strand is unwound onto a bobbin, the forming package and the bobbin being mounted on a twist frame. During the unwinding and rewinding step, a twist is imparted into the strand which provides integrity for subsequent processing.

When the twisted strand or yarn is to be used for textile applications as previously described, two standard processes are employed to prepare the yarn. A plurality of bobbins are mounted on racks. The end of each bobbin is threaded through a tensioning disc and through a plurality of guide eyes, over a separating comb and onto a beam which is a large cylinder. The plurality of yarn ends are wound on this beam in parallel. This process is known as beaming. The yarn on the beam is used for the warp of a textile glass fabric.

The weft of the textile fabric which is woven generally perpenduicularly into parallel twisted strands coming off the beam is supplied by a quill mounted on an apparatus which weaves the weft yarn into the warp yarn. The quill is a spool of small diameter which has the yarn thereon supplied by a bobbin produced as previously described.

After the fabric is woven, it is heat cleaned to remove the size and set the fibers in the fabric. This heating is conducted at a temperature of about 1,200° to 1,400°F. for 30 to 40 seconds and is sufficient to volatilize the solids and remove them from the fabric and to soften the glass fibers in the fabric to set them in their new position. This process is described in greater detail in U.S. Pat. NO. 2,845,364.

Because the weft and warp of the fabric are composed of twisted strand or yarn, the filaments are compressed into the yarn by the twist. Thus, it is necessary to use a plurality of these strands or yarn ends per square inch to have an adequate fill to produce an acceptable fabric. It has been desired by the manufacturers of fabrics to have yarn having no twist so that after heat treatment the single filaments would dissociate from their compacted form and provide increased filling characteristics thus reducing the amount of glass necessary to produce an acceptable fabric. However, yarn without twist has great difficulty in undergoing especially the quilling operation without breaking or fuzzing because once the single filament breaks, it has a tendency to strip away from the strand thus forming fuzz balls and lint. A further advantage of utilizing a yarn without twist in weaving applications is that the yarn can be pulled directly from the inside of the forming package and wound on quills thereby avoiding the additional steps of transferring the yarn from the forming package to the bobbin. However, problems have been encountered in pulling the yarn from the forming package to the bobbin because the strands have a tendency to adhere to each other. Thus, when a package is end found, e.g., a single strand is pulled from the center of a forming package and unwinding is begun. During the pulling while being unwound the strand coheres to other portions of the strand and a large tangle is pulled from the center of the forming package, thus causing a shutdown of the winding operation of the quills.

The instant invention provides a sizing composition and a method of applying the sizing composition to glass fibers which enables untwisted yarns to be utilized in weaving applications. Further, the invention provides a strand which can be pulled from the inside of the forming package without cohering to other portions of the strand. Also, the invention provides an untwisted strand capable of being woven in its untwisted form with relatively little fuzzing or lint accumulation on the weaving equipment. Still further, the instant invention provides a textile fabric which can be efficiently coronized without any adverse effects on the surface of the fabric.

In accordance with the instant invention, the glass fiber sizing composition is provided which comprises a starch, a lubricant, a textile softener and a nonionic wetting agent. The nonionic wetting agents in the sizing composition are at a level of 100 to 150 percent by weight based on the weight of the lubricant.

The starch component of the sizing composition is typically an amylose starch mixture having an amylose content of about 35 to 45 percent by weight and formed by admixing approximately equal proportions of: (a) a high amylose starch fraction viz. one containing about 50 to 60 percent by weight of amylose with a greater portion of the remainder being amylopectin and (b) a water repellent, low amylose starch fraction viz. one containing about 20 to 30 percent by weight of amylose with the greater portion of the remainder being amylopectin.

The basic starch components of the amylose containing starch employed in the starch mixture can be derived from any starch sources including corn, wheat, potato, tapioca, waxy maize, sago, rice, hybrid starches, etc. Conveniently, however, the starch component having the high amylose content, viz. 50 to 60 percent by weight, is derived either from potato starch or a hybrid corn starch having over 50 percent by weight amylose and the starch component having the low amylose content, viz. 20 to 30 percent by weight, as derived from corn starch. The overall amylose content of the starch mixture can vary from 35 to 45 percent by weight based on total starch content.

The high amylose starch component preferably contains about 55 percent by weight of amylose with the remainder being amylopectin. The high amylose component can constitute from about 45 to 55 percent by weight based on total starch content of the starch mixture. Preferably the high amylose component constitutes about 50 percent by weight of the starch mixture. When the high amylose component is employed in amounts significantly in excess of 55 percent by weight, it becomes increasingly difficult to mix the two starch components especially in aqueous media and the viscosity characteristics are deleteriously affected. Moreover, the burnoff of the binder becomes more difficult and expensive.

The low amylose content starch component is a water repellent starch which preferably contains from 25 to 27 percent amylose with the remainder being amylopectin. Instead of pure starch, the low amylose content component can and preferably does contain cross-links. Thus, preferably the low amylose content component is a lightly cross-linked corn starch having an amylose content of from 25 to 27 percent by weight. The starch components provide the sizing composition with bulk and impart strand integrity to the sized glass fibers, thus diminishing the development of fuzz which can lead to strand breakage. The low amylose content component being of a viscous nature can also be used contributing to the nonmigratory nature of the sizing composition. The low amylose component constitutes from about 45 to 55 percent by weight of the mixture based on total starch content and preferably about 50 percent by weight thereof.

The term "starch mixture" as used herein is intended to be descriptive of the fact that a plurality of different starches each having different amylose content, are employed in the instant sizing composition and not to preclude the possibility of chemical interaction between the starch molecules of each of the starch components. In fact, some chemical bonding can be present between the molecules of both the high amylose starch and the low amylose starch, and such starch mixtures possessing intermolecular bonding between the starch components are considered to be within the realm of this invention.

Also considered to be included within this invention are starch mixtures wherein the low amylose component and the high amylose component are lightly cross bonded to provide a weak knit, yet three dimensional composite starch network which is water soluble or water dispersible.

Textile softeners are employed in the sizing composition in amounts which are sufficient to provide softening action to the sized strands. Such amounts being for example 4 to 15 percent by weight of the said amylose containing starch derivatives and preferably about 10 percent by weight of the said amylose containing starch derivatives. Typical textile softeners are alkyl imidazoline derivatives such as described in U.S. Pat. No. 2,200,815, 2,267,965, 2,268,273 and 2,355,837 which are incorporated herein by reference and made a part hereof.

Cation X is an example of such a material wherein the alkyl imidazoline derivative is the reaction product of stearic acid, tetraethylene pentamine and acetic acid. Acid solubilized water dispersible stearic amides and anhydrous acid solubilized water dispersible lower molecular weight fatty acid amides as well as anhydrous acid solubilized polyunsaturated lower molecular weight fatty acid amides can also be used as a softener.

The nonionic wetting agents useful in the practice of the invention which give this sizing composition its advantageous characteristics as a nontwisted weaving yarn are those having typically a hydrophilic and a hydrophobic molecular structure at juxaposed ends of the molecules thereof. Examples of suitable nonionic wetting agents include polyalkylene derivatives of esters, fatty acids, fatty alcohols, fatty amides, alkyl phenyl ethers and other derivatives. A preferable nonionic wetting agent useful in the practice of the instant invention is polyethylene glycol 600 monolaurate which is shown to be effective in a range of 40 to 100 percent by weight based on the weight of the lubricant in the sizing composition.

The lubricants which are found to be useful in the practice of the invention are typically vegetable oils which have been hydrogenated. A typical vegetable oil would be hydrogenated cottonseed oil, hydrogenated corn oil, hydrogenated soybean oil and the like.

In addition to the lubricant, starch, textile softener and a nonionic wetting agent, other ingredients may be added to the sizing composition to impart properties which are known to those skilled in the art. Cationic agents which can be included in the sizing composition such as cetyl or stearyl monoamine hydrochloride or acetate, decylamine, hexadecylamine and secondary and tertiary derivatives of the same, for example, dodecyl methylamine and salts thereof. Quaternary ammonium compounds such as trimethylstearyl ammonium bromides and chlorides and generally any of the amine compounds which dissociate in aqueous systems to provide a positive radical containing a group of more than 10, preferably 12 or more carbon atoms can be employed. These materials are cationic active substances.

A fungicide, such as one of the metalo-organic quaternary type, e.g., tributyltin oxide can be employed in sufficient amount to prevent mold attack on the amylose containing starch derivatives. Suitable effective amounts of the fungicide are about 3 milliliters to 75 gallons of the sizing composition.

Plasticizers can be employed in the sizing compositions to lessen the brittleness of the strand and to improve the end finding thereof. Carbowax 300 is a polyethylene glycol with an average molecular weight of 300. Further, polyethylene glycol is believed to impart even tension properties to the sized strand.

If desired, polyethylene glycol can be employed in conjunction with a water soluble polyvinyl alcohol in the size. This is often desirable because of the added film strength properties which sizing compositions containing this combination impart. The ratio of polyvinyl alcohol to the polyethylene glycol when used in combination ranges from about 1 to 1 to 2 to 1. The combined amount of polyethylene glycol and polyvinyl alcohol in the size is about 0.1 to about 0.2 percent by weight of the amylose containing starch component.

In place of the low molecular weight polyethylene glycol, glycerine can be employed in similar weight concentrations, either alone or in admixture with polyvinyl alcohol. For most purposes however, the use of polyethylene glycol is preferred since it is less hygroscopic than glycerine.

Typically, the overall solids content of the size can vary from about 4 to 8 percent by weight. It should be noted that the solids content can be adjusted in accordance with the desired solids content for the specific forming conditions employed. Generally, the solids content will range from 5 to 7 percent by weight and preferably from 6.3 to 6.7 percent by weight. By solids content is meant the residual solids remaining after drying the sizing composition at 105°C. to constant weight. The invention will be ellucidated by its further description in the following examples.

EXAMPLE I

A sizing composition having the following ingredients was prepared:

| Ingredient | Amount (Grams) |
| --- | --- |
| Amylomaize (hybrid corn starch having an amylose content 55 percent by weight) | 955 |
| National HFS (corn starch cross-linked with phosphorous oxychloride and having 27 percent by weight amylose) | 955 |
| Pureco Oil (hydrogenated cottonseed oil) | 425 |
| Tween 81 (ethylene oxide derivative of a sorbitol ester) | 95 |
| Cation X (alkyl imidazoline reaction product of tetraethylene pentamine and stearic acid) | 190 |
| Carbowax 300 (polyethylene glycol having a molecular weight of approximately 300) | 231 |
| Igepal CA-630 [octyl phenoxy poly-(ethyleneoxy) ethanol - wetting agent] | 141 |
| C-Sn-6 (organo-tin bacteriocide) | .37 |
| Polyethylene glycol 600 monolaurate (a monolaurate ester of polyethylene glycol having an average molecular weight of 600) | 200 |
| Water | sufficient to make volume of 10 gallons |

The following procedure is used to mix the aforementioned ingredients. The Pureco Oil is added to a premix tank along with the Tween 81 with agitation. The premix tank is heated to 190°F. while agitation is continued by means of an Eppenbach mixer. When the temperature reaches 190°F., the heat is withdrawn from the premix tank. At this time hot water at a temperature of 140° to 180°F. is added to the premix tank until an oil and water emulsion is formed. The mixture is then allowed to homogenize under agitation with the Eppenbach mixer at a temperature of about 120°F. for 30 minutes. At this time the Igepal CA-630 is added to the Pureco Oil-Tween 81 emulsion.

To a cold premix tank is added 1.5 gallons of water. The starch is then added to this premix tank with agitation until all lumps are dissolved. The starch is cooked in a jet cooker at a temperature of 220° ± 2°F. for a sufficient period of time to allow the starch to go into the aqueous system, e.g., for a period of 0.5 to 1.0 minute per pound of starch. The Pureco Oil — Tween 81 — Igepal CA—630 emulsion is then added to the main mix tank and the Cation X is added thereto with agitation. After the starch mixture has cooled to 150°F., it is added to the main mix tank. The Carbowax 300 and C-Sn-6 are then added to the main mix tank. The main mix tank is agitated for 5 minutes with the Eppenbach agitator. After cooling to 120°F. enough water is added to the sizing composition to bring the volume to 10 gallons at which time the polyethylene glycol 600 monolaurate is added to the sizing composition. Agitation is maintained for a period of 30 minutes after the addition of the polyethylene glycol 600 monolaurate.

The aqueous sizing composition as thus prepared is adjusted to a pH of 6.0 ± 0.5 and has a solids content of 6.50 ± 0.30.

The sizing composition is applied to the glass fibers from an applicator during their formation. The filaments are gathered into strand by means of a gathering shoe and then wound on a rotating drum-type winder onto a forming tube. The collet on which the forming package rides was rotated at 4,420 revolutions per minute and the spiral directing the strand onto the forming package was operating at 2,300 revolutions per minute. The applicator used was a rotating belt-type applicator rotating at 133 revolutions per minute. After the winding of the forming package was completed, the package was placed in an oven for 9 hours at 180°F.

After conditioning, the paper forming tube was removed from the interior of the forming package and single end was found. This untwisted strand was tested for quilling and lint shedding.

Quilling was tested by winding the above yarn on a spool which is 8 inches in length by five-sixteenths inch diameter. After the winding was completed, the number of broken filaments on the surface of the quill was counted. After two such windings, one quill had 7 broken filaments and the other had 3 broken filaments which is an A rating. The following rating system was used:

| | |
| --- | --- |
| "A" | 0 to 7 broken filaments |
| "A/B" | 8 broken filaments |
| "B" | 9 to 15 broken filaments |
| "B/C" | 16 broken filaments |
| "C" | 17 to 26 broken filaments |
| "C/D" | 27 broken filaments |
| "D" | 28 or more broken filaments |

An acceptable grade for quilling of yarn is from A to B. Thus, the strand or yarn above formed was acceptable for the quilling of yarn.

Lint shedding is a test simulating the beaming of yarn. The strand from the inside of the forming package was passed through a tensioning disc and two guide eyes and a separating comb and wound on a spool. Twelve such ends were parallel wound simultaneously to form a simulated beam. Lint shedding was rated as follows:

| | |
|---|---|
| "A" | None |
| "B" | Slight |
| "C" | Readily noticeable |
| "D" | Excessive |

The strand as produced above had a lint shedding grade of B which is satisfactory for weaving.

The above strand was used in a standard weaving operation to form the weft of a fabric and it was found that the weaving performance was excellent and that the fabric so formed had excellent heat cleaning properties and good filling characteristics.

EXAMPLE II

A sizing composition was formulated, applied and tested in accordance with the procedure of Example I, except that 400 grams of polyethylene glycol monolaurate was used instead of 200 grams of polyethylene glycol monolaurate.

The quills made in accordance with Example II had a quill rating range between A and B and lint shedding was found to be satisfactory. The weaving performance of the yarn of Example II was comparable to the yarn of Example I.

Thus, the untwisted glass fiber yarn produced in accordance with this invention has been shown to quill, weave and heat clean satisfactorily with a minimum amount of lint shedding and breakage of the filaments.

Also, the invention is shown to provide an excellent filling yarn in that a smaller amount of the yarn is necessary to provide the necessary bulk to a particular fabric. Further, the yarn of the invention has excellent heat cleaning characteristics.

The yarn of the invention is a particularly economical yarn in that it does not have to undergo the processes of twisting and being transferred to a bobbin from the forming package. The forming package itself can be used directly in the weaving operation to form quills in which the yarn mounted thereon will be used for the weft of a fabric.

Although the present invention has been described with respect to the specific details of certain embodiments thereof, it is not intended that such details serve as limitations upon the scope and spirit of this invention only insofar as set forth in the accompanying claims.

I claim:

1. In an aqueous glass fiber size comprising a starch, vegetable oil as a lubricant, a textile softener, and a nonionic wetting agent, the improvement comprising said size containing 150 to 100 percent by weight of said nonionic wetting agents based on the weight of said lubricant.

2. The glass fiber size of claim 1 having therein 95 to 105 percent of said nonionic wetting agents based on the weight of said lubricant.

3. The glass fiber size of claim 1 wherein 45 to 65 percent by weight of said nonionic wetting agents composed of polyethylene glycol monolaurate, the polyethylene glycol moiety thereof having an average molecular weight of about 600.

4. The glass fiber size of claim 1 having a water content of 91 to 96 percent by weight.

* * * * *